(12) United States Patent
Degenhardt et al.

(10) Patent No.: US 12,129,052 B1
(45) Date of Patent: Oct. 29, 2024

(54) MICROGRAVITY IN LOW EARTH ORBIT WITH CONTINUOUS ELECTRIC PROPULSION

(71) Applicant: Blue Origin, LLC, Kent, WA (US)

(72) Inventors: David Degenhardt, Kent, WA (US); Kyle Patrick Doyle, Bellevue, WA (US); David Aaron Kornuta, Federal Way, WA (US); Zachary Reid Tolley, Kent, WA (US)

(73) Assignee: Blue Origin, LLC, Kent, WA (US)

( * ) Notice: Subject to any disclaimer, the term of this patent is extended or adjusted under 35 U.S.C. 154(b) by 132 days.

(21) Appl. No.: 17/661,023

(22) Filed: Apr. 27, 2022

(51) Int. Cl.
*B64G 1/40* (2006.01)
*B64G 1/44* (2006.01)
*B64G 1/60* (2006.01)
*B64G 1/64* (2006.01)

(52) U.S. Cl.
CPC .......... *B64G 1/409* (2013.01); *B64G 1/402* (2013.01); *B64G 1/443* (2013.01); *B64G 1/60* (2013.01); *B64G 1/646* (2013.01)

(58) Field of Classification Search
CPC .......... B64G 1/60; B64G 1/646; B64G 1/402; B64G 1/409; B64G 1/443
See application file for complete search history.

(56) References Cited

U.S. PATENT DOCUMENTS

2017/0259946 A1* 9/2017 White, Jr. .............. B64G 1/60

OTHER PUBLICATIONS

Andrews, Shaun M. "Effect of Ion Thruster Plume-Thermosphere Interaction on Satellite Drag in Very Low Earth Orbit." 70th International Astronautical Congress (IAC), Washington D.C., United States, Oct. 21-25, 2019. pp. 1-17.
Fearn, David G. "Economical remote sensing from a low altitude with continuous drag compensation." Acta Astronautica. 56 (2005) 555-572.
Garulli, Andrea et al.. "Autonomous Low Earth Orbit Station-Keeping with Electric Propulsion." pp. 1-32. May 23, 2012.
Oleson, Steven R. et al. "Electric Propulsion for International Space Station Reboost: A Fresh Look." NASA/TM-2002-211313. Jan. 2002. AIAA-2001-3644. pp. 1-18. Available at: https://ntrs.nasa.gov/search.jsp?R=20020038749 2020-05-28T18:52:11+00:00Z. (Accessed Nov. 7, 2022).

(Continued)

*Primary Examiner* — Tye William Abell
(74) *Attorney, Agent, or Firm* — Knobbe, Martens, Olson & Bear, LLP

(57) ABSTRACT

Systems and methods for achieving pristine microgravity in low earth orbit (LEO) using electric propulsion. Long-duration, low thrust, electric thrusters provide a constant thrust force for a pristine microgravity environment within a given volume of a space vehicle experiencing drag forces in LEO. Large space vehicles in LEO configured to be pressurized for human habitation, for instance having a mass of at least 40,000 kg and an internal volume of at least 400 m³, can use the electric propulsion systems and methods to achieve a quasi-steady acceleration less than or equal to 1.0 μg for durations of 180 consecutive days or longer.

27 Claims, 3 Drawing Sheets

(56) References Cited

OTHER PUBLICATIONS

Sovey, James S. et al. "Advanced Propulsion for LEO and GEO Platforms." Nasa Technical Memorandum 103228. AIAA-90-2551. Prepared for the 21st International Electric Propulsion Conference cosponsored by the AIAA, DGLR, and JSAss. Orlando, Florida, Jul. 18-20, 1990. Available at: https://ntrs.nasa.gov/search.jsp?R=19900018469 2020-05-28T19:02:53+00:00Z (accessed Nov. 7, 2022).
NASA, 17th International Microgravity Measurements Group Meeting. The NASA STI Program Office . . . in Profile. NASA/CP-1998-208414. Proceedings of a conference held at Ohio Aerospace Institute, Brook Park, Ohio. Mar. 24-26, 1998. Jun. 1988. 299 pages.
NASA, International Space Station Facts and Figures. Available at https://www.nasa.gov/feature/facts-and-figures Dated Nov. 2, 2022. (Accessed Nov. 7, 2022).
NASA, NASA's Lunar Outpost will Extend Human Presence in Deep Space. Available at https://www.nasa.gov/feature/nasa-s-lunar-outpost-will-extend-human-presence-in-deep-space. Dated May 2, 2018 (Accessed Nov. 7, 2022).
NASA, Solar Electric Propulsion (SEP). Available at: https://www.nasa.gov/mission_pages/tdm/sep/index.html; accessed on Nov. 7, 2022.
System Specification for the International Space Station Type 1. Contract No. NAS15-10000. CDRL No. MG02 Prepared for National Aeronautics and Space Administration (NASA). Prepared by: Boeing Defense & Space Group Missiles & Space Division (a division of The Boeing Company) Houston, Texas. SSP 41000E. Jul. 3, 1996. pp. 1-12.
NASA, The International Space Station. Operating an Outpost in the New Frontier. National Aeronautics and Space Administration. Dated Apr. 13, 2018. Available at: https://www.nasa.gov/sites/default/files/atoms/files/iss-operating_an_outpost-tagged.pdf (Accessed Nov. 7, 2022) pp. 1, 8, 9, 140, 163-170, 327 of PDF.

* cited by examiner

MICROGRAVITY IN LOW EARTH ORBIT WITH CONTINUOUS ELECTRIC PROPULSION

BACKGROUND

Field

This disclosure relates to microgravity in orbital space flight, in particular to achieving microgravity in low earth orbit (LEO) using electric propulsion.

Description of the Related Art

Microgravity in space flight may be used for many purposes, including manufacturing, biomedical research, pharmacological production, and others. However, a certain level of the quality of the microgravity environment is required. Existing solutions for achieving microgravity in LEO produce deficient microgravity environments that prevent fully capitalizing on these and other commercial activities. Improvements to drawbacks of existing approaches to producing microgravity environments in space are needed.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to microgravity.

Systems and methods are described herein for achieving pristine microgravity in LEO using electric propulsion. Long-duration, low thrust, electric thrusters, such as solar electric thrusters, provide a constant thrust force for a pristine microgravity environment within a given volume of a space vehicle experiencing drag forces in LEO. Large space vehicles in LEO configured to be pressurized for human habitation can use the electric propulsion systems and methods to achieve very low quasi-steady accelerations for months or even years.

In one aspect, a system for maintaining a micro-gravity environment in low earth orbit (LEO) is described. The system comprises a space vehicle and a solar electric propulsion system. The space vehicle has an internal volume of at least 400 m³ configured to be pressurized for human habitation, a mass of at least 40,000 kg, and is configured to travel in LEO along an orbit in a forward direction. A drag force acts on the space vehicle in an aft direction opposite the forward direction when the space vehicle travels in LEO. The solar electric propulsion system comprises a propellant storage tank configured to hold at least 300 kg of Xenon, and a plurality of electric propulsion thrusters configured to collectively generate a thrust force in the forward direction continuously for a time period of at least 180 days and with a magnitude approximately equal to the drag force, such that the internal volume within the space vehicle maintains over the time period a quasi-steady acceleration less than or equal to 1.0 µg.

Various embodiments of the various aspects may be implemented. The plurality of electric propulsion thrusters may be configured to collectively generate the thrust force such that at least 160 m³ of the internal volume maintains over the time period a quasi-steady acceleration less than or equal to 0.5 µg. The plurality of electric propulsion thrusters may be configured to collectively generate the thrust force such that at least 8 m³ of the internal volume maintains over the time period a quasi-steady acceleration less than or equal to 0.1 µg. The plurality of electric propulsion thrusters may be configured to collectively generate the thrust force such that the orbit is maintained between +/−10 km of a desired orbital altitude during the time period. The desired orbital altitude may be between about 350 km and about 450 km. The system may further comprise a drop tower space within the space vehicle, where the plurality of electric propulsion thrusters are configured to collectively generate the thrust force such that a payload released within the drop tower space experiences pristine microgravity continuously for at least 15 minutes. The drag force may be greater than or equal to 0.050 Newtons. The plurality of electric propulsion thrusters may comprise a plurality of Hall effect thrusters each having at least 1 kW power output. The plurality of electric propulsion thrusters may be gimballed. The plurality of electric propulsion thrusters may each have a specific impulse of 2,600 s. The propellant storage tank may be configured to hold at least 500 kg of Xenon. The space vehicle may further comprise a solar array configured to generate electrical energy for use by the solar electric propulsion system.

The space vehicle may comprise a first habitat portion and a second habitat portion. The first habitat portion may have a volume of at least 400 m³, and the second habitat portion may have a volume of at least 550 m³. The first habitat portion and the second habitat portion may each have a length of at least 14 meters and an outer diameter of at least 6 meters.

The system may further comprise a docking node configured to couple the second habitat with the first habitat. The docking node may be an integral part of the first habitat or the second habitat. The docking node may have a volume of at least 250 m³. The system may further comprise a service module containing the solar electric propulsion system, where the service module is configured to couple with the first habitat portion.

The time period may be at least 1800 days in the absence of external forces other than drag. The time period may be at least ten years.

The plurality of electric propulsion thrusters may draw 1 kW while in operation. The plurality of electric propulsion thrusters may comprise five or more electric propulsion thrusters. One or more of the plurality of electric propulsion thrusters may be redundant. The plurality of electric propulsion thrusters may be configured to generate the thrust force continuously such that a first derivative of the orbital altitude with respect to time exists over the entire time period. The plurality of electric propulsion thrusters may be configured to generate the thrust force continuously such that a plot of orbital altitude versus time contains no sharp points over the entire time period. The plurality of electric propulsion thrusters may be configured to generate the thrust force continuously such that a plot of orbital altitude versus time is smooth over the entire time period.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Figure 1:
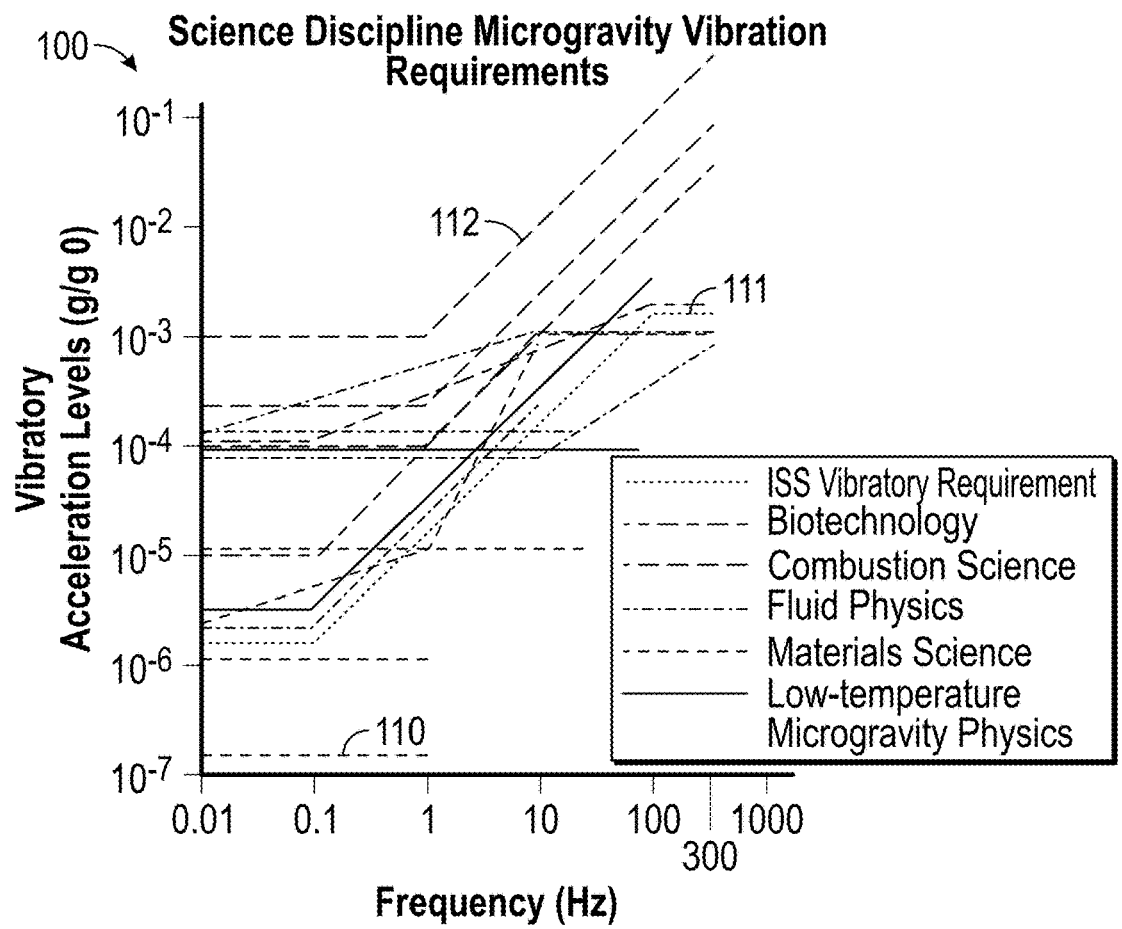
FIG. 1 is a plot showing example microgravity vibration requirements.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the present disclosure.

Various embodiments are described of systems and methods for achieving pristine microgravity in LEO using electric propulsion. Long-duration, low thrust electric propulsion thrusters, such as solar electric propulsion thrusters, provide a constant thrust force for a pristine microgravity environment within a given volume of a space vehicle experiencing drag forces in LEO. Large space vehicles in LEO, which may be configured to be pressurized for human habitation, and for instance having a mass of at least 40,000 kg and an internal volume of at least 400 m$^3$, can use the electric propulsion systems and methods to achieve very low quasi-steady accelerations, for example less than or equal to 1.0 μg, and for long durations, for example 180 consecutive days or longer.

Low thrust electric propulsion systems (such as solar electric propulsion) are ideally suited for providing continuous thrust for orbital maintenance for habitats and laboratories in LEO. By running nearly continuously, these thrusters apply just enough force on the mass of the vehicle to counter the deceleration caused by atmospheric drag at low orbital altitude. The thrust can be varied to equal atmospheric drag by gimbaling one, two or more thrusters such that they produce a net force only in the direction of travel, activating a specific number of thrusters out of a bank of thrusters, or throttling the thruster or thrusters themselves. Even running nearly 100% of the time, these thrusters require lower power and propellant loads for vehicles with lives of ten years or more, relative to periodic re-boost. To extend life even further, redundant thrusters can be added for use in the case of engine failures over time.

As NASA and private organizations look to utilize the benefits of microgravity for manufacturing, biomedical, and pharmacological production for commercial purposes in low earth orbit (LEO), the quality of that environment becomes of high importance. FIG. 1 is a plot 100 showing example microgravity vibration requirements for various fields of study. Plot 100 is based on information from Robert C. Rhome, *Baseline Microgravity Requirements for Scientific Research on the International Space Station*, Jun. 17, 1996, referenced in *System Specification for the International Space Station, Type 1, Contract No. NAS15-10000, CDRL. No. MG02*, prepared by Boeing Defense & Space Group Missiles & Space Divisional, Jul. 3, 1996. The X axis is frequencies on a logarithmic scale, from 0.01 Hz to 1000 Hz and higher. The Y axis is vibratory acceleration levels from $10^{-7}$ g/g$_o$ (vibratory acceleration in g's over acceleration due to gravity from Earth's pull for a given altitude in LEO) to $10^{-1}$ g/g$_o$. n LEO, the gravity acceleration acting on the vehicle due to Earth may be about 9 m/s$^2$ depending on the exact altitude. For example, at an altitude of 250 km, the gravity acceleration may be 9 m/s$^2$. At an altitude of 400 km, the gravity acceleration may be 8.7 m/s$^2$. Various lines representing requirements for respective fields of study are provided as shown in the key. The corresponding lines in the plot 100 range from a first data line 110 having a vibratory requirement of about $10^{-6.75}$ g/g$_o$ up to a frequency of about 1 Hz, to a second data line 112 having a vibratory requirement of about $10^{-3}$ g/g$_o$ up to a frequency of about 1 Hz and then increasing with increased frequency, as shown.

The systems and methods for microgravity in LEO described herein provide for continuous achievement of vibratory requirements at or below any of these example data lines. In some embodiments, the systems and methods for microgravity in LEO described herein may be used to achieve vibratory requirements that are at or below the second data line 112. In some embodiments, the systems and methods for microgravity in LEO described herein may be used to achieve vibratory requirements or conditions that are at or below the data lines for the "ISS vibratory requirement," for "biotechnology," for "combustion science," for "fluid physics," for "material science," or for "low-temperature microgravity physics" conditions, as shown in the key for the plot 100 in FIG. 1. Using a third data line 111 as an example (for ISS vibratory requirements), the systems and methods for electric propulsion described herein may achieve vibratory acceleration levels below the following requirements: at or about $10^{-5.75}$ $g/g_o$ up to frequencies at or about 0.1 Hz; increasing vibratory acceleration level linearly to or about to $10^{-2.9}$ $g/g_o$ from 0.1 Hz to 100 Hz; and at or about $10^{-2.9}$ $g/g_o$ at frequencies greater than 100 Hz. Applicable performance targets may be inferred from the other data lines shown in the plot 100. These are merely some example data lines against which the systems and methods described herein may be measured for performance, and other data lines may be used.

The systems and methods described herein allow for research that requires more pristine microgravity than existing LEO solutions can currently offer. Processes such as Stoke's settling, Bridgman growth, and float zone require <0.1 μg and could lead to improvements in semiconductor manufacturing among other things. The systems and methods described herein are designed to enable research at these levels of microgravity by implementing an electric constant thrust system described herein.

Today, the full spectrum of desired microgravity applications cannot be fully explored using existing solutions because the only current and near-term laboratories in LEO have restrictive qualities. For example, when not in a reboost phase, LEO vehicles are constantly decelerating due to drag. This impacts the microgravity environment. Traditional LEO facilities therefore use chemical reboost periodically. The effect of such re-boost on orbital altitude is shown in FIG. 2.

Figure 2:
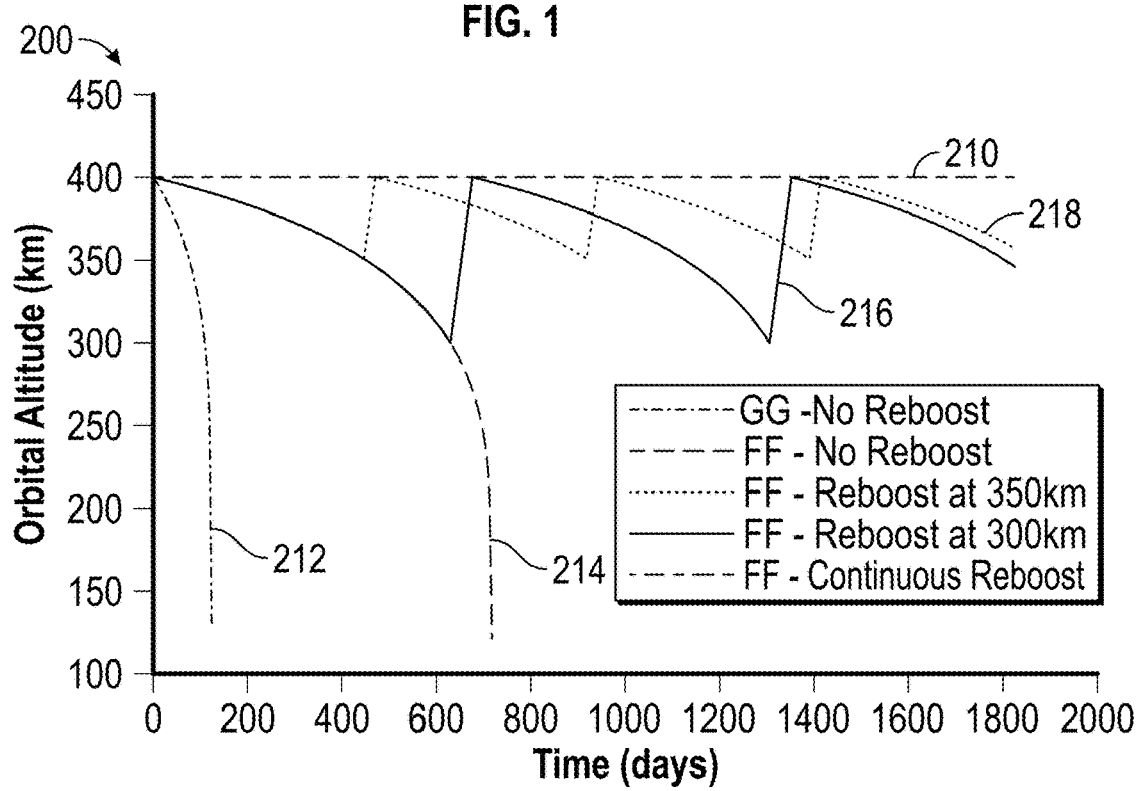
FIG. 2 is a data plot showing an embodiment of orbital altitude maintenance that may be achieved using the electric propulsion systems and methods described herein as compared to altitudes attained with typical chemical re-boost solutions.

FIG. 2 is a data plot 200 showing an embodiment of orbital altitude maintenance that may be achieved using the electric propulsion systems and methods described herein, and comparing it to typical reboost altitude data lines. The X axis is time in days from 0 to 2000 days. The Y axis is orbital altitude in kilometers (km) from 100 km to 450 km.

During the reboost phase, traditional LEO vehicles or facilities (i.e. orbiting structures) use high thrust chemical propulsion systems either on the facility or on a visiting vehicle that is docked. These reboost phases can seriously degrade or restrict the microgravity environment as they impart acceleration on the vehicle and all systems within it. This may interrupt microgravity research and experiments, limiting the duration of microgravity research that current facilities, such as the ISS, can support. The effects of such periodic reboost are shown in the plot 200 by the data lines 212, 214, 216, and 218. The data lines 212 and 214 show example orbital altitudes where no reboost is provided. The orbits for data lines 212 and 214 thus begin at 400 km and without reboost the altitude drops to below 150 km within about 125 days and 700 days, respectively. The data line 212 represents an orbiting facility with its longitudinal axis (which may be the axis of minimum moment of inertia) aligned with the gravity gradient of Earth, which may be towards the center of the planet. The data line 214 represents an orbiting facility with its longitudinal axis aligned with a vector pointing in the direction of forward movement of the facility, which is perpendicular to the gravity gradient. Note that the "no Reboost" vehicle represented by data line 214 remains in orbit for nearly two years while the "no Reboost" vehicle represented by data line 212 reenters Earth's atmosphere in less than 200 days.

The data lines 216 and 218 show the orbital altitude gradually decreases due to drag acting on the vehicle and then sharply increase due to the periodic re-boost. These "sawtooth" patterns result from conventional, periodic chemical reboost solutions. The data line 216 represents a vehicle using periodic reboost when the altitude drops to 300 km, and the data line 218 represents a vehicle using periodic reboost when the altitude drops to 350 km. Both data lines 216, 218 exhibit sharp points along plots that are not smooth. The first derivative of the data lines 216, 218 does not exist at the sharp vertices in the plots.

In contrast, the data line 210 represents a vehicle using the continuous thrust electric propulsion systems and methods described herein. Running the low thrust propulsion system as continuously as possible improves the quality of the microgravity environment by reducing or virtually eliminating the saw-tooth patterns seen in FIG. 1. The altitude for the data line 210 thus maintains a 400 km orbit or about 400 km for 1,800 days or more. Other altitudes within LEO may be achieved for this and other time periods. A variety of orbital altitudes within LEO may be maintained for a time period of at least 30 days, at least 60 days, at least 90 days, at least 120 days, at least 150 days, at least 180 days, at least 210 days, at least 240 days, at least 270 days, at least 300 days, at least 330 days, at least 360 days, at least one year, at least 1.5 years, at least two years, at least three years, at least four years, at least 1800 days, at least five years, at least ten years, or longer, or any ranges of time between any of these time periods. A first derivative with respect to time, of the orbital altitude corresponding to the data line 210, exists over the entire time period from zero to 1800 days. The data line 210 contains no sharp points. The data line 210 is smooth over the entire time period.

"LEO" as used herein has its usual and customary meaning and includes, without limitation, orbital altitudes of 2,000 km or less, of 1,500 km or less, of 1,000 km or less, of 750 km or less, of 600 km or less, of 500 km or less, of 400 km or less, of 300 km or less, of 200 km or less, or any range of altitudes between any of these altitudes. The LEO orbit may be between 250 km and 550 km, between 275 km and 525 km, between 300 km and 500 km, between 325 km and 475 km, between 350 km and 450 km, or between 375 km and 425 km. The orbital altitude maintained may be within +/−5 km, within +/−7.5 km, within +/−10 km, within +/−12.5 km, within +/−15 km, within +/−17.5 km, within +/−20 km, or within +/−25 km of the desired orbital altitude. The LEO orbit may include an orbital period of 128 minutes or less. The LEO orbit may have an eccentricity of 0.25 or less. In some embodiments, the vehicle may have an orbit with a perigee altitude of 408±10 km, an apogee altitude of 410±10 km, and an inclination of 51.6±0.1 degrees.

By utilizing constant electric propulsion for a LEO laboratory, industries would have access to sustained, pristine microgravity (e.g., less than 1 μg) not available elsewhere. Electric propulsion running nearly constantly can be used to provide constant thrust for orbital maintenance of habitats, laboratories, and manufacturing facilities in LEO where the quality of microgravity is of high or critical value. Electric propulsion for LEO habitats, laboratories, and manufacturing facilities according to the present disclosure significantly improves the quality of the microgravity environment.

In some embodiments, the electric propulsion systems and methods described herein provide a desired quasi-steady acceleration over any of the time periods described herein. The quasi-steady acceleration may be less than or equal to 1.25 μg, less than or equal to 1.125 μg, less than or equal to 1.0 μg, less than or equal to 0.75 μg, less than or equal to 0.625 μg, less than or equal to 0.5 μg, less than or equal to 0.4 μg, less than or equal to 0.3 μg, less than or equal to 0.2

µg, or less than or equal to 0.1 µg. These and other quasi-steady accelerations may be achieved within certain volumetric envelopes of the vehicle. In some embodiments, the vehicle may have an internal volume of at least 400 m$^3$ and the space vehicle may maintain a quasi-steady acceleration within this volume less than or equal to 1.0 µg or less than or equal to 0.5 µg. In some embodiments, at least 160 m$^3$ of the internal volume maintains over the time period a quasi-steady acceleration less than or equal to 0.5 µg. In some embodiments, at least 8 m$^3$ of the internal volume maintains a quasi-steady acceleration less than or equal to 0.1 µg.

"Quasi-steady acceleration" as used herein has its usual and customary meaning and includes, without limitation, low frequency range accelerations, for example frequencies between 0 Hz and 1 Hz. The quasi-steady acceleration environment may be composed of several parts. Three components of the total quasi-steady acceleration environment may dominate: aerodynamic drag, gravity gradient effects, and vehicle rotational effects. At any point in time throughout the time a vehicle is in LEO orbit (such as the time defined by a mission), the quasi-steady acceleration environment experienced by a component in the vehicle is primarily the collective sum of these three components. The electric propulsion systems and methods described herein counteract the forces due to drag to contribute to maintaining the quasi-steady acceleration.

The gravity gradient may be the dominant source of quasi-steady acceleration for most of the payload volume in the vehicle. Distance in the zenith, nadir, port, and starboard directions from the forward velocity vector passing through the Center of Gravity (CG) adds quasi-steady accelerations. In the zenith and nadir directions of the vehicle, these accelerations may be approximately 0.384 µg/m. In the port and starboard directions of the vehicle, these accelerations are approximately 0.128 µg/m. Effects of gravity gradient accelerations in the forward and aft direction are negligible. These are example accelerations, which may vary depending on the vehicle and environment. These example accelerations may be, for example, for a vehicle having a mass of at least 40,000 kg and dimensions of approximately at least 30 meters long and at least 6 meters in diameter. It will be understood that vehicles having other suitable masses and dimensions having features in accordance with the advantageous aspects of the present disclosure will also experience very low accelerations.

The electric propulsion systems and methods described herein can be sized and tailored to apply just enough continuous force on a given vehicle to counteract the average drag at the nominal orbital altitude. The forces are small enough that even running constantly the system would require minimal power and propellant over the life of the vehicle. The drag force experienced by the vehicle in LEO and counteracted by the electric propulsion systems and methods described herein may be greater than or equal to 0.050 Newtons (N). In some embodiments, the drag force may be greater than or equal to 0.100 N, greater than or equal to 0.075 N, greater than or equal to 0.050 N, greater than or equal to 0.040 N, greater than or equal to 0.030 N, greater than or equal to 0.020 N, greater than or equal to 0.010 N, or greater. In some embodiments, the drag force may be less than or equal to 0.050 N, less than or equal to 0.100 N, less than or equal to 0.075 N, less than or equal to 0.050 N, less than or equal to 0.040 N, less than or equal to 0.030 N, less than or equal to 0.020 N, less than or equal to 0.010 N, or less.

Due to atmospheric drag, a traditional LEO habitat is decelerating during nominal operations, impacting the microgravity environment. The loss in velocity and altitude are then countered by periodic reboost from chemical propulsion systems, which poses an even greater detriment to the microgravity environment as the accelerations and vibrations on the vehicle can be high. Systems using continuous thrust as described herein overcome these impacts by utilizing low thrust propulsion provided at a level that cancels out drag and eliminates it from the quasi-steady acceleration component of the microgravity environment. This results in the area closest to the centerline of a habitat, and especially the area closest to the center of gravity (CG), having a very pristine level of quasi-steady acceleration. The quasi-steady acceleration can be as low as 0.1 µg or less, an order of magnitude better than that which is currently available on the International Space Station (ISS). In some embodiments, the constant electric propulsion results in approximately 20 m$^3$ of the vehicle volume having a quasi-steady acceleration of 0.1 µg or less. In some embodiments, about 450 m$^3$ have a quasi-steady acceleration of less than 0.5 µg. In addition to constant thrust eliminating deceleration due to aerodynamic drag, it also reduces or substantially eliminates accelerations that are typically generated by periodic high thrust chemical propulsion reboost in conventional systems. Electric thrusters have no moving parts, produce micro-g's of acceleration, and produce minimal to no measurable vibrations while operating.

Figure 3:
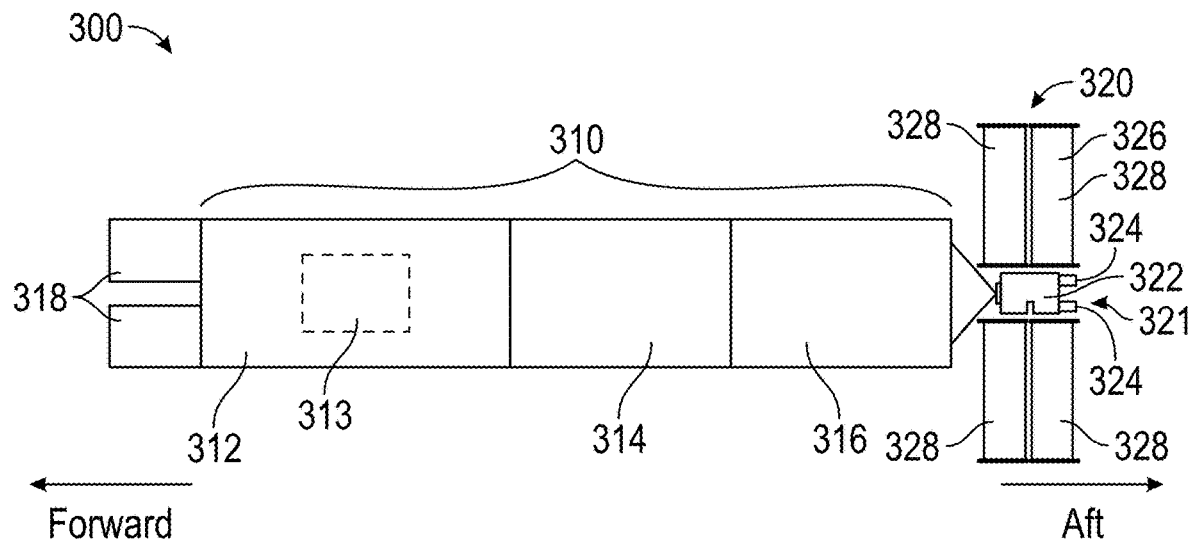
FIG. 3 is a schematic side view of an embodiment of a space vehicle having an electric propulsion system according to the present disclosure.

FIG. 3 is a schematic side view of an embodiment of a space vehicle 300 having an electric propulsion system 321 according to the present disclosure. The space vehicle 300 is configured to travel in LEO along an orbit in a "forward" direction, as indicated in FIG. 3. A drag force acts on the space vehicle in an "aft" direction, as indicated in FIG. 3, opposite the forward direction when the space vehicle travels in LEO. The vehicle 300 may be habitable by humans or non-habitable, or a combination thereof. The vehicle 300 may be or include a habitat, a spacecraft, a laboratory, a satellite, a collection of modules, other suitable LEO space objects, or combinations thereof. As shown, the vehicle 300 may include a habitable module 310 and a service module 320. However, it is understood this particular embodiment is only for the sake of illustration and that the space vehicle 300 is not limited to this configuration, shape, size, etc. Numerous types of space vehicles 300 may use the propulsion systems and methods described herein. A velocity vector of the vehicle may point in the forward direction. The attitude of the vehicle may include the longitudinal axis of the vehicle aligned with the forward velocity vector with a pointing accuracy of ±0.5°.

The habitable module 310 may include a first habitat portion 312, a docking node 314, and a second habitat portion 316. The first habitat portion 312 includes thrusters 318 that propel the habitable module 310 into the desired orbit. The thrusters 318 may be a second or third stage used after launch of the vehicle 310. The first habitat portion 312 may be connected to the docking node 314, which may be connected to the second habitat portion 316. Advantageously, the habitat portions 312, 316 and the docking node 314 may be connected or fully integrated together at launch and inserted into orbit together. The space vehicle 300 may have a variety of different configurations. For example, the docking node 314 may be located forward of the first habitat portion 312, or aft of the second habitat portion 316. The thrusters 318 may be on the forward or aft end of the space vehicle 300, and/or on the sides. There may be fewer or more than two habitat portions 312, 316 and/or more than one docking node 314. There may be additional modules, for example habitable portions or docking nodes, located on one or more lateral sides of one or more of the habitat portions 312, 316 and/or on the docking node 314. "Lateral" here refers to a direction perpendicular to the forward direction of travel. Additional vehicles may dock with the vehicle 310 at the docking node 314. The docking node may have a volume of at least 250 m$^3$. In some embodiments, the docking node may have a volume of at least 50 m$^3$, at least 100 m$^3$, at least 150 m$^3$, at least 200 m$^3$, at least 300 m$^3$, at least 350 m$^3$, at least 400 m$^3$, at least 450 m$^3$, or at least 500 m$^3$ or share a volume with the first habitat. The habitat portion 312 may be used for conducting experiments in microgravity. The habitat portion 316 may be quarters for the crew.

The mass of the space vehicle 300 may be at least 40,000 kg. This mass of the space vehicle 300 may be the total masses of the habitable portion 310 and the service module 320. In some embodiments, the mass of the space vehicle 300 may include that of any vehicles docked to the docking node 314. The mass of the space vehicle 300 may be at least 10,000 kg, at least 15,000 kg, at least 20,000 kg, at least 25,000 kg, at least 30,000 kg, at least 35,000 kg, at least 45,000 kg, at least 50,000 kg, at least 55,000 kg, at least 60,000 kg, at least 75,000 kg, at least 100,000 kg, at least 200,000 kg, at least 300,000 kg, at least 400,000 kg, at least 500,000 kg, at least 750,000 kg, or at least 1,000,000 kg. The space vehicle 300 either in total or for any portion(s) thereof, such as for the habitable module 310, may have an internal volume of at least 100 m$^3$, at least 200 m$^3$, at least 300 m$^3$, at least 400 m$^3$, at least 500 m$^3$, at least 600 m$^3$, at least 700 m$^3$, at least 750 m$^3$, at least 800 m$^3$, at least 900 m$^3$, at least 1,000 m$^3$, at least 1,100 m$^3$, at least 1,200 m$^3$, at least 1,300 m$^3$, at least 1,400 m$^3$, at least 1,500 m$^3$, at least 2,000 m$^3$, at least 3,000 m$^3$, at least 4,000 m$^3$, at least 5,000 m$^3$, at least 6,000 m$^3$, at least 7,000 m$^3$, or at least 8,000 m$^3$. In some embodiments, the first and second habitat portions 312, 316, either individually or collectively, may have any of the aforementioned internal volume amounts. In some embodiments, the second habitat portion 316 may have a volume of at least 550 m$^3$. Some or all of the internal volume may be configured to be pressurized for human habitation.

The first habitat portion 312 and the second habitat portion 316 may each have a length of at least 14 meters and an outer diameter of at least 6 meters. In some embodiments, the first habitat portion 312 and/or the second habitat portion 316 may each have a length of at least 5 meters, at least 7 meters, at least 9 meters, at least 11 meters, at least 13 meters, at least 15 meters, at least 17 meters, at least 19 meters, at least 25 meters, at least 30 meters, at least 35 meters, at least 45 meters, at least 50 meters, at least 75 meters, at least 100 meters, at least 125 meters, at least 150 meters, or at least 200 meters. The space vehicle 300 may have a total length of any of the aforementioned lengths. In some embodiments, the first habitat portion 312 and/or the second habitat portion 316 may each have an outer width, e.g. diameter, of at least 2 meters, at least 3 meters, at least 4 meters, at least 5 meters, at least 7 meters, at least 8 meters, at least 9 meters, at least 10 meters, at least 11 meters, at least 12 meters, at least 15 meters, at least 20 meters, at least 30 meters, at least 40 meters, at least 50 meters, at least 60 meters, at least 70 meters, at least 100 meters, or at least 200 meters. The space vehicle 300 may have a total width of any of the aforementioned widths.

The volumetric dimensions of the vehicle may allow for features for drastically reducing the effects of vibrations to the vehicle and components therein. Such vibrations may be caused by visiting vehicles, crew, and other vehicle systems. A particularly challenging time for microgravity research on a vehicle in LEO is during the peak occupancy for crew rotation. While it is possible to mitigate vibration somewhat for experimental payloads using both active and passive isolation systems, eliminating vibration is impossible while structurally connected to a constantly vibrating vehicle.

A unique possibility to address these vibratory problems, given a large open volume in the vehicle described herein, is a "drop tower" for research with the most demanding microgravity and vibration requirements. The habitable module 310 may include a drop tower space 313. The drop tower space 313 may be a volumetric envelope defined within the first habitable portion 312. A payload released within the drop tower space 313 may experience pristine microgravity continuously for a period of time. The payload may experience pristine microgravity continuously for at least 2 minutes, for at least 5 minutes, for at least 7.5 minutes, for at least 10 minutes, for at least 12.5 minutes, for at least 15 minutes, for at least 17.5 minutes, for at least 20 minutes, or for at least 25 minutes. The payload may drift within the drop tower space 313 less than certain distances over a given period of time, as further described with respect to FIG. 6.

The service module 320 includes the electric propulsion system 321 and the solar array 326. The solar array includes a plurality of solar panels 328. There may be four solar panels 328, or fewer or greater than four solar panels 328. The solar array 326 collects energy from the sun's rays and converts it into electrical energy that is stored in one or more batteries and directed to electrical components of the vehicle 300. The electrical energy may be used by the electric propulsion system 321.

The electric propulsion system 321 may be any of a variety of different types of electric propulsion systems. The electric propulsion system 321 may make use of electrical power to accelerate a propellant by different possible electrical and/or magnetic means. The electric propulsion system 321 may be a solar electric propulsion system, that uses solar energy converted by the solar array into electric power. In some embodiments, other power systems may be used to generate electrical power to feed to the thrusters, such as nuclear power systems. Therefore, the particular embodiment of the solar electric propulsion system shown in the figures is for illustration only, and it is understood that any of a variety of different types and configurations of electric propulsion systems may be used.

The electric propulsion system 321 includes a propellant storage tank 322 and a plurality of thrusters 324. There may be two, three, four, five, or more thrusters 324, as further described herein with respect to FIG. 4. The thrusters 324 are electric thrusters that create an electric field to accelerate the propellant in the aft direction to create a thrust force in the forward direction that counteracts the drag forces on the vehicle. The thrusters 324 may have any of the same or similar features and/or functions as the thrusters described with respect to FIG. 4, and vice versa. The thrusters 324 may be used solely for counteracting drag to achieve a desired microgravity environment. The thrusters 324 may be separate from an attitude control system (ACS), such as reaction wheels, star trackers, gyros, etc., to control the orientation of the vehicle. In some embodiments, the thrusters 324 may contribute to control of the vehicle's attitude. For example, by gimbaling the thrusters 324 slightly during thrust operations, they can be used to assist in desaturating reaction wheels without additional power cycles for the thrusters 324.

The electric thrusters 324 have a significantly higher specific impulse (Isp) than chemical thrusters. The thrusters 324 may each have a specific impulse of 2,600 seconds (s). In some embodiments, the thrusters 324 may each have a specific impulse of at least 1,500 s, at least 1,750 s, at least 2,000 s, at least 2,250 s, at least 2,500 s, at least 2,600 s, at least 2,700 s, at least 2800 s, at least 2,900 s, or at least 3,000 s.

This higher efficiency of the electric thrusters 324 compared to chemical propulsion saves on up-mass of propellant required for orbital maintenance because less propellant mass is required to be launched with the vehicle 300. This also alleviates the structural demands on both the vehicle 300 and any visiting vehicles which historically have been used for reboost. The electric thrusters 324 are also compact enough to allow multiple redundant thrusters to be added, preventing loss of reboost capability in the case of a thruster failure.

The thrusters 324 may be gridded electrostatic thrusters or ion thrusters. The thrusters 324 may be Hall-effect thrusters (also called Hall thrusters or Hall-current thrusters) in which the propellant is accelerated by an electric field. The thrusters 324 may use a magnetic field to limit the electrons' axial motion and then use them to ionize propellant, efficiently accelerate the ions to produce thrust, and neutralize the ions in the plume. In some embodiments, the thrusters 324 may be gridded ion engine (GIE), high efficiency multistage plasma thrusters (HEMPT), pulsed plasma thrusters (PPT), magneto plasma dynamic (MPD) thrusters, quad confinement thrusters (QCT), resistojet, arcjet, field emission electric propulsion (FEEP) thrusters, colloid and electrospray thrusters, electrode-less thrusters, or hollow cathode and neutralizers.

The thrusters 324 may each be single- or multi-kilowatt (KW) Hall effect thrusters, for example having an output power of 1 kW, 2 2 kW, 3 KW, 4 KW, 5 KW, 6 KW, or any other suitable power output. The thrusters 324 may be gimballed such that they can rotate to direct the thrust force in a desired direction. The thrusters 324 may draw 1 kW while in operation. The thrusters may draw 0.5 kW or less, 0.75 KW or less, 1 kW or less, 1.25 KW or less, 1.5 kW or less, 1.75 kW or less, or 2 kW or less while in operation. There may be one or more redundant thrusters 324. For example, there may be five or more thrusters 324, where one or more of the five thrusters 324 may be used as backup in the event of failure of one or more of the other thrusters 324 and normal operational parameters for microgravity (as described herein) for the mission may be maintained.

The propellant storage tank 322 is configured to hold at least 300 kg of propellant. In some embodiments, the tank 322 may be configured to hold at least 50 kg, at least 100 kg, at least 150 kg, at least 200 kg, at least 250 kg, at least 350 kg, at least 400 kg, at least 450 kg, at least 500 kg, at least 550 kg, at least 600 kg, or at least 650 kg of propellant. The propellant may be Xenon. In some embodiments, the propellant may be krypton, argon, bismuth, iodine, magnesium or zinc.

Figure 4:
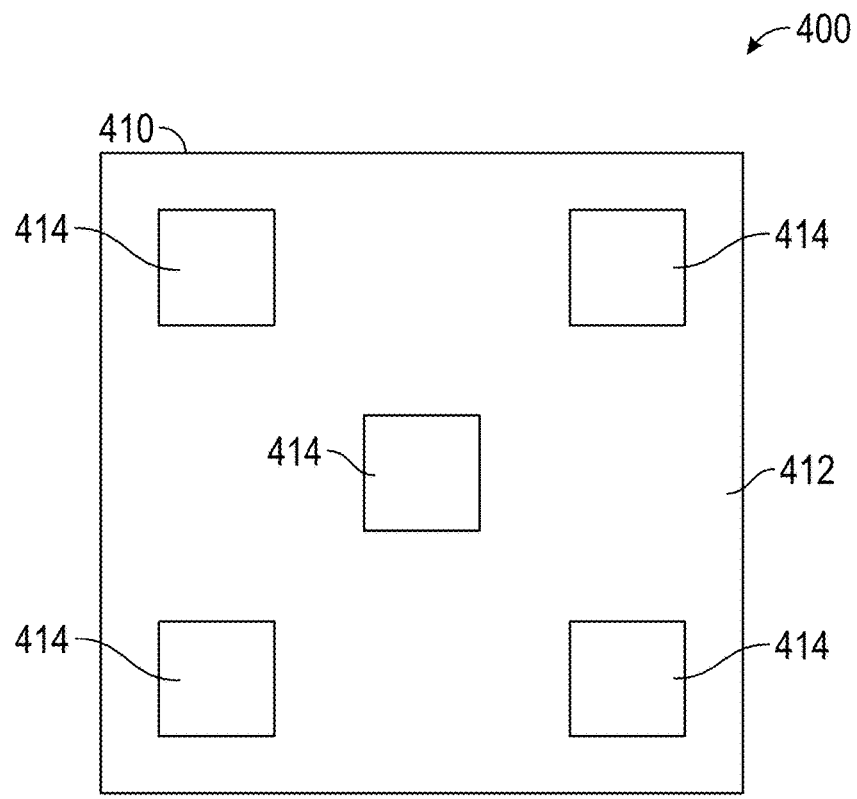
FIG. 4 is a schematic end view of an embodiment of an electric propulsion system according to the present disclosure.

FIG. 4 is a schematic end view of an embodiment of an electric propulsion system 400, such as a solar electric propulsion system. The system 400 may be attached to and used with the vehicle 300. The system 400 may have the same or similar features and/or functions as the electric propulsion system 321 shown in FIG. 3, and vice versa.

As shown in FIG. 4, the system 400 includes a housing 410 and five thrusters 414. The housing 410 may be a structural support for the thrusters 414. The thrusters 414 may be mounted to the housing 410. The housing 410 may include a propellant storage tank, and/or other components of the service module 320 (shown in FIG. 3). The thrusters 414 are located on an end surface 412 of the housing 410. The thrusters 414 emit propellant away from the surface 412 to provide a thrust force in the opposite direction. The thrusters 414 therefore may each provide a thrust force in a direction that is parallel to or nearly parallel to a direction of travel of the vehicle to which it is attached.

There may be five thrusters 414 as shown. In some embodiments, there may be fewer or greater than five thrusters 414. There may be two, three, four, five, six, seven, eight, nine, ten, or more, of the thrusters 414. The thrusters 414 may be arranged as shown with four at the vertices of a square and the fifth at the center. Other arrangements may be used.

Figure 5:
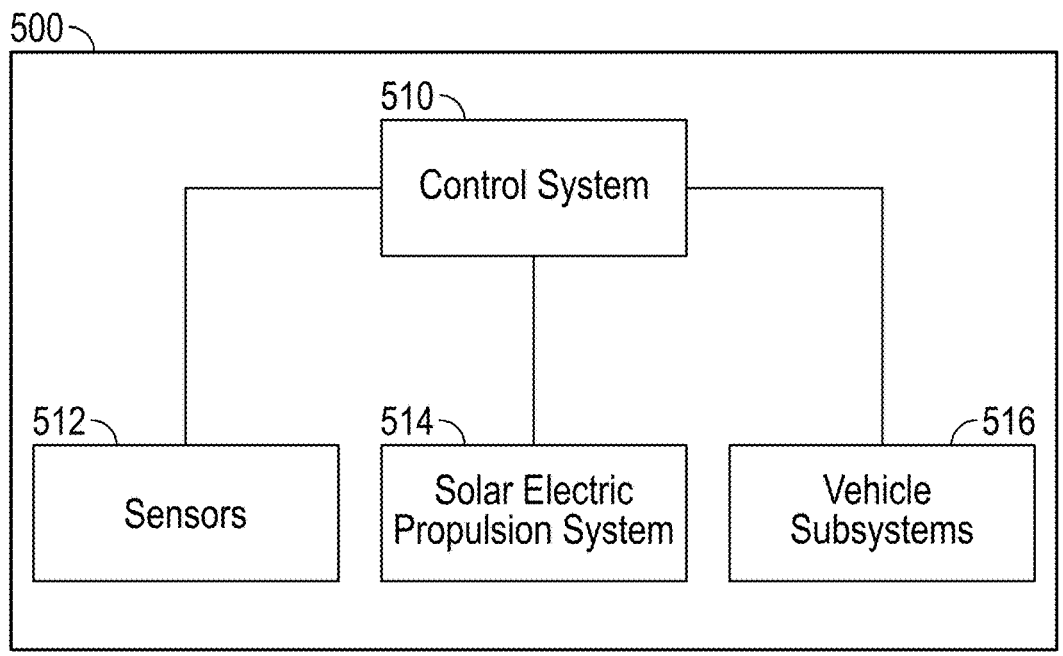
FIG. 5 is a block diagram showing an embodiment of a space vehicle and control system for controlling an electric propulsion system according to the present disclosure.

FIG. 5 is a block diagram showing an embodiment of a space vehicle 500 having a control system 510 in communication with and controlling an electric propulsion system 514. The vehicle 500 and electric propulsion system 514 may have the same or similar features and/or function as, respectively, the vehicle 300 and the electric propulsion system 321, and vice versa.

The control system 510 may include software and/or hardware programmed to receive data from one or more sensors 512 with which the control system 510 is in communication. The sensors 512 may include quasi-steady acceleration sensors, quasi-steady acceleration indicators, flow cell accelerometers, inertial measurement units (IMU's), piezoelectric accelerometers, piezoresistance accelerometers, capacitive accelerometers, gyroscopes, magnetometers, star trackers, and/or other sensors. The control system 510 may analyze the data from the sensors 512 and increase or decrease thrust supplied by the electric propulsion system 514, re-orient or gimbal one or more of the thrusters of the electric propulsion system 514, turn one or more of the thrusters on or off, or perform other actions with the electric propulsion system 514. The electric propulsion system 514 may be controlled for station-keeping purposes. Data may be received related to experiments being performed in microgravity environments, such as signals indicating start or end of an experiment, or changes in requirements for the level of microgravity. The control system 510 may also be in communication with other vehicle subsystem 516, such as power, thermal, communications, bus, or other subsystems. Data from these and other subsystems may be analyzed to control the electric propulsion system 514.

Figure 6:
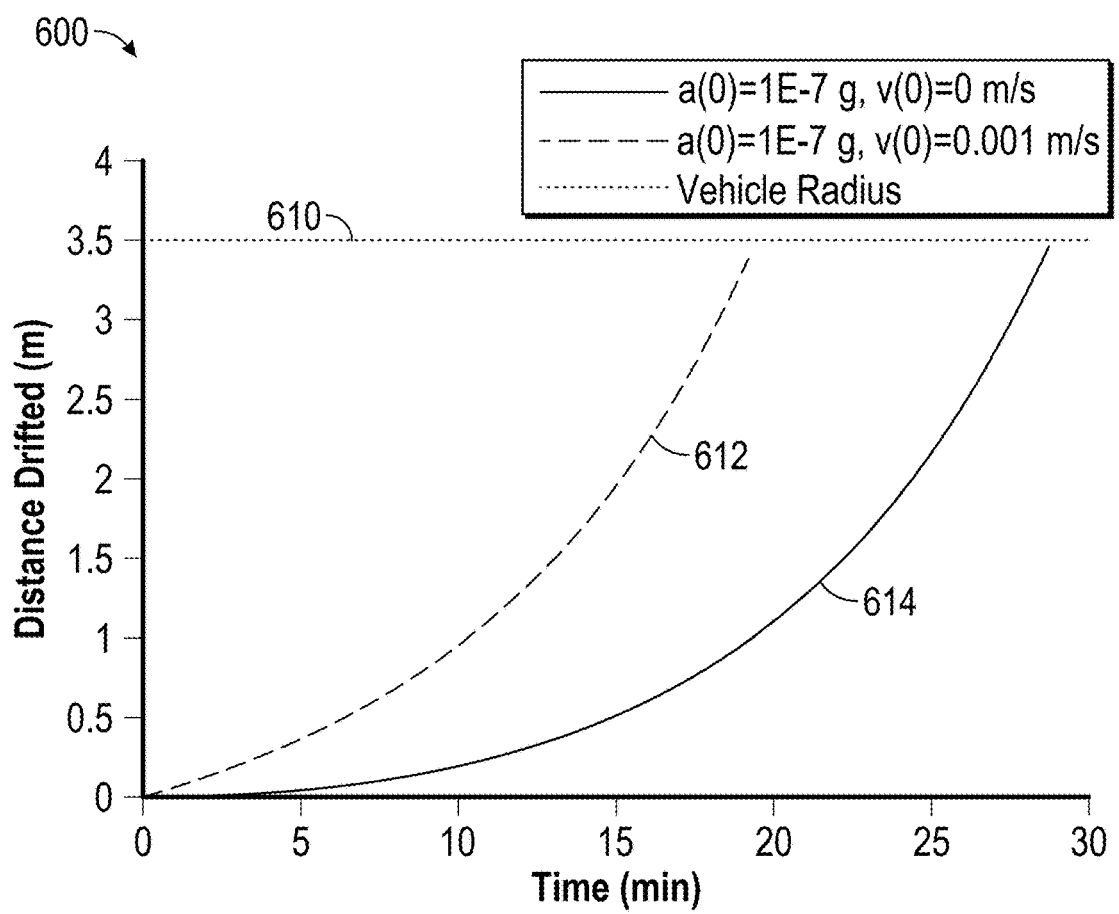
FIG. 6 is a data plot showing an embodiment of microgravity drop zone drift that may be achieved using the electric propulsion systems and methods described herein.

FIG. 6 is a data plot 600 showing an embodiment of microgravity drop zone drift that may be achieved using the electric propulsion systems and methods described herein. The Y axis is distance drifted in meters (m) from a starting position beginning at zero meters and ending at 4 meters. The X axis is time in minutes beginning at zero minutes and ending at 30 minutes. The various systems and methods for microgravity described herein may be used to achieve the drift performance characteristics shown in the data plot 600. The drift characteristics may be achieved within the drop tower space 313.

The plot 600 includes a horizontal line 610 which is the radius of the vehicle. This may be the radius of the habitable module 310, for example the first habitat portion 312. This may be an upper limit on how far the object may travel before it hits an inner wall of the vehicle. As shown, in this example the line 610 refers to a radius of 3.5 m. The data lines 612 and 614 show the drift of an object having different starting velocities but exposed to identical microgravity acceleration environments. The acceleration experienced by objects for both data lines 612, 614 is 1×10⁻⁷ g. The starting velocity for the object along data line 612 is 0.001 m/s, and the starting velocity for the object along data line 614 is 0 m/s. As shown, the object travelling along the data line 612 contacts the inner radius (data line 610) at about 19 minutes, while the object travelling along the data line 612 contacts the inner radius at about 28 minutes. Thus, in some embodiments, free-floating payloads in the vehicle can experience pristine microgravity for almost 30 minutes and with gentler recovery in between trials. A payload released near the centerline of the vehicle with an initial velocity of 0.001 m/s relative to the vehicle could take almost 20 minutes to drift to the wall of the vehicle. Recovery between trials is quick and gentle, without the landing shock of a terrestrial drop tower or the lengthy periods of multiple-g's experienced in parabolic or suborbital flights. For example, such experiments performed during parabolic flights have a window that is only in the range of seconds, and such experiments performed during suborbital flights have a window lasting only a few minutes and cannot be quickly repeated. The systems and methods described herein thus provide for longer duration trials and less down-time between trials, in comparison to both parabolic and suborbital flights. These are just some examples of the advantageous drift characteristics that may be achieved with the systems and methods described herein.

While the above detailed description has shown, described, and pointed out novel features of the present disclosure as applied to various embodiments, it will be understood that various omissions, substitutions, and changes in the form and details of the system or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure

What is claimed is:

1. A system for maintaining a micro-gravity environment in low earth orbit (LEO), the system comprising:
    a space vehicle having an internal volume of at least 400 m³ configured to be pressurized for human habitation, a mass of at least 40,000 kg, and configured to travel in LEO along an orbit in a forward direction, wherein a drag force acts on the space vehicle in an aft direction opposite the forward direction when the space vehicle travels in LEO; and a solar electric propulsion system comprising:
a propellant storage tank configured to hold at least 300 kg of Xenon; and
a plurality of electric propulsion thrusters configured to collectively generate a thrust force in the forward direction continuously for a time period of at least 180 days and with a magnitude substantially equal to the drag force such that the internal volume within the space vehicle maintains over the time period a quasi-steady acceleration less than or equal to 1.0 µg.

2. The system of claim 1, wherein the plurality of electric propulsion thrusters are configured to collectively generate the thrust force such that at least 160 m³ of the internal volume maintains over the time period a quasi-steady acceleration less than or equal to 0.5 µg.

3. The system of claim 1, wherein the plurality of electric propulsion thrusters are configured to collectively generate the thrust force such that at least 8 m³ of the internal volume maintains over the time period a quasi-steady acceleration less than or equal to 0.1 µg.

4. The system of claim 1, further comprising a drop tower space within the space vehicle, wherein the plurality of electric propulsion thrusters are configured to collectively generate the thrust force such that a payload released within the drop tower space experiences pristine microgravity continuously for at least 15 minutes.

5. The system of claim 1, wherein the drag force is greater than or equal to 0.050 Newtons.

6. The system of claim 1, wherein the plurality of electric propulsion thrusters comprises a plurality of Hall effect thrusters each having at least 1 kW power output.

7. The system of claim 1, wherein the plurality of electric propulsion thrusters are gimballed.

8. The system of claim 1, wherein the plurality of electric propulsion thrusters each have a specific impulse of 2,600 s.

9. The system of claim 1, wherein the propellant storage tank is configured to hold at least 500 kg of Xenon.

10. The system of claim 1, where the space vehicle further comprises a solar array configured to generate electrical energy for use by the solar electric propulsion system.

11. The system of claim 1, wherein the time period is at least 1800 days in the absence of external forces other than drag.

12. The system of claim 1, wherein the time period is at least ten years.

13. The system of claim 1, wherein the plurality of electric propulsion thrusters draw 1 kW while in operation.

14. The system of claim 1, wherein the plurality of electric propulsion thrusters comprises five or more electric propulsion thrusters.

15. The system of claim 1, wherein one or more of the plurality of electric propulsion thrusters is redundant.

16. The system of claim 1, wherein the plurality of electric propulsion thrusters are configured to generate the thrust force continuously such that a first derivative of the orbital altitude with respect to time exists over the entire time period.

17. The system of claim 1, wherein the plurality of electric propulsion thrusters are configured to generate the thrust force continuously such that a plot of orbital altitude versus time contains no points over the entire time period.

18. The system of claim 1, wherein the plurality of electric propulsion thrusters are configured to generate the thrust force continuously such that a plot of orbital altitude versus time is substantially planar over the entire time period.

19. The system of claim 1, wherein the plurality of electric propulsion thrusters are configured to collectively generate the thrust force such that the orbit is maintained between +/−10 km of a desired orbital altitude during the time period.

20. The system of claim 19, wherein the desired orbital altitude is between about 350 km and about 450 km.

21. The system of claim 1, wherein the space vehicle comprises a first habitat portion and a second habitat portion.

22. The system of claim 21, wherein the first habitat portion has a volume of at least 400 m³, and the second habitat portion has a volume of at least 550 m³.

23. The system of claim 21, wherein the first habitat portion and the second habitat portion each have a length of at least 14 meters and an outer diameter of at least 6 meters.

24. The system of claim 21, further comprising a service module containing the solar electric propulsion system, wherein the service module is configured to couple with the first habitat portion.

25. The system of claim 21, further comprising a docking node configured to couple the second habitat with the first habitat.

26. The system of claim 25, wherein the docking node is an integral part of the first or the second habitat.

27. The system of claim 25, wherein the docking node has a volume of at least 250 m³.

* * * * *